Figure 1:
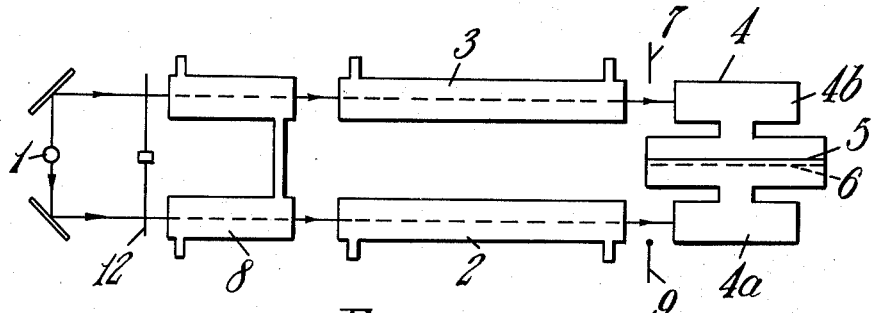

United States Patent Office 3,193,676
Patented July 6, 1965

3,193,676
INFRA-RED GAS ANALYSERS
John Smart, Newcastle-upon-Tyne, England, assignor to Sir Howard Grubb Parsons & Company Limited, Newcastle-upon-Tyne, England
Filed Nov. 26, 1962, Ser. No. 240,041
Claims priority, application Great Britain, Dec. 15, 1961, 45,062/61
6 Claims. (Cl. 250—43.5)

This invention relates to infra-red gas analysers of the kind wherein infra-red radiation from a source is directed along two beam paths, one of which contains a sample fluid under test and the other of which is a reference path, before falling on a detector. The reference path does not absorb radiation which would normally be absorbed by the sample, and may consist of an empty absorption cell or a cell containing a gas such as nitrogen which has little or no absorption in the infra-red. A rotating shutter interrupts both beam paths intermittently.

The detector used with such analysers is normally of the pneumatic type that is to say it comprises a chamber divided into two separate compartments by a diaphragm located adjacent to a fixed perforated electrode. The two separate compartments are filled with the component or components of interest in the sample or a gas having a similar spectral region of absorption. One compartment receives radiation from the sample path and the other compartment radiation from the reference path. When the gas of interest is not present in the sample the pressures in the two chambers are arranged to balance, for example by adjusting the radiation arriving at the detector chamber from one path by means of a balancing shutter in said path which shutter can cut off part of the radiation.

When however, the gas of interest appears in the sample a pressure difference is produced across the diaphragm and, as the diaphragm and electrode act as an electrical condenser, an electrical signal is produced which is a measure of the gas of interest in the sample. This electrical signal is amplified and commonly used to operate a recording meter which indicates the amount of a particular component present in the sample.

The zero of the meter is set initially by passing a non-absorbing gas through the sample tube and adjusting the balancing shutter so that the meter is set at zero.

Zero drift is inevitable over a period of time with such analysers due to such factors as ageing of the infra-red source with slightly different effects on the two beam paths and loss of radiation transmission through the sample tube as a result of corrosion or the deposition of foreign matter on the walls and windows of the tube by the sample gas.

It is therefore, necessary to check the zero setting from time to time and this can be done by repeating the technique described for the initial zero setting namely passing a non-absorbing gas through the sample tube.

A further check must also be made at intervals on the sensitivity since, in addition to the changes already mentioned, amplifier gain and detector sensitivity are also liable to vary over a period of time.

Some instruments are equipped with a calibrating device consisting of a wire or similar attenuator which can be introduced into the analysis path. With a non-absorbing gas in the analysis tube the calibrating wire removes a fixed proportion of energy from the beam and under constant conditions this should correspond to a definite deflection on the meter. In practice, however, the filling of the detecting condenser may change slowly with time and the wire reading does not give a completely reliable sensitivity check although it does give a useful, if rough, check.

When an accurate sensitivity check is required it is necessary to use a standard gas mixture or a test gas which can be accurately analysed.

In some operating conditions it is not possible to stop the passage of sample gas through the sample tube and then neither the zero setting check nor an accurate sensitivity check can be carried out by the methods described above as both require replacement of the sample gas by a different gas.

The object of the present invention is to provide an infra-red gas analyser that can be checked for zero setting and, if desired, for sensitivity without the need for cutting off the supply of sample gas through the instrument.

The invention consists in an infra-red gas analyser comprising a source of radiation, means directing said radiation into two beam paths one path having a cell containing a sample under test and the other path being a reference path, a detector comprising a chamber divided into two separate compartments by a diaphragm adjacent to which is a fixed electrode, one compartment receiving the radiation from the sample path and the other compartment receiving radiation from the reference path, both compartments containing gases identical with the component or components whose presence in the sample gas is to be measured or containing gases having spectral regions of absorption similar thereto and the compartments containing an additional gas or gases having a region of absorption different from that of any of the gases present in the sample to which the detector is sensitive, a balancing shutter in one beam path, filter means insertable in at least the sample path during periods of zero and/or sensitivity check only, which filter means absorb all the wavelengths capable of being absorbed by the component or components to be determined in the sample but transmit the wavelengths capable of being absorbed by said additional gas or gases in the detector and a rotating shutter interrupting both beam paths intermittently between the source and the detector.

The invenion also consists in an infra-red gas analyser in accordance with the preceding paragraph in which the filter means are constituted by solid optical filters.

The invention also consists in an infra-red gas analyser in accordance with the first of the preceding two paragraphs in which the filter means are constituted by gaseous filters.

The invention also consists in a gas analyser in accordance with any of the three preceding paragraphs in which to enable sensitivity to be checked at intervals the sample path includes a cell into which a calibrating gas or gas mixture may be introduced, during periods of checking.

The invention also consists in a gas analyser in accordance with the preceding paragraph in which the cell for checking sensitivity is one which is also used during periods of zero setting as a cell housing a gaseous filter.

Figure 2:
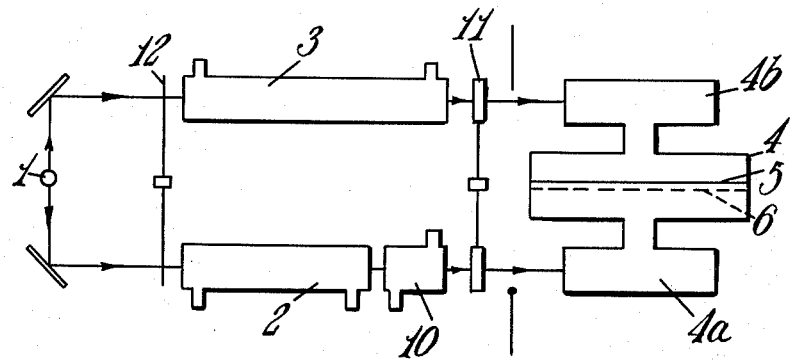

The invention also consists in an infra-red gas analyser substantially as described here with reference to either of the accompanying diagrammatic drawings in which:

FIGURE 1 shows an analyser in accordance with one embodiment of the invention using gaseous filters, FIGURE 2 shows an alternative embodiment of the invention using optical filters and incorporating a calibrating cell.

In carrying the invention into effect in the forms illustrated by way of example and referring first to FIGURE 1, an infra-red gas analyser comprises a source of radiation 1 which may take the form of a single element from which radiation is directed into two beam paths as shown, or two elements each of which forms its own beam path. In one path of radiation is a cell 2 into which a sample under test is introduced. In the other beam path is a vessel or cell 3 which is empty or into which is introduced a gas which does not absorb infrared radiation. It could, for example contain nitrogen. This cell 3 acts as a reference cell.

The detector 4 comprises a chamber which is divided into two separate compartments 4a, 4b by a diaphragm 5 adjacent a fixed perforated electrode 6. The diaphragm and electrode constitute an elecrical condenser the capacitance of which is varied by movement of the diaphragm as a result of changes of pressure in the gases in the compartments 4a, 4b.

The chambers 4a and 4b are filled with a gas or gases which are to be detected in the sample or gases which have substantially the same spectral region of absorption.

A balancing shutter 7 is placed in a path preferably the reference path so that when no sample is present the pressure in each compartment 4a, 4b can be made the same.

The electrical signal from the detector is amplified, fed to a recorder or indicating meter and the meter is adjusted to give a zero reading when the pressure in each of the compartments 4a, 4b, is the same with no sample present. An alternating signal from the detector is produced by a rotating shutter 12 which alternately transmits both beams simultaneously and cuts off both beams simultaneously.

The instrument described thus far is a standard instrument and to allow for periodic checks of the zero setting the instrument is modified in accordance with the invention by introducing additional gas into the compartments 4a and 4b. This additional gas or gases has a spectral region of absorption which is outside the region of absorption of any gas present in the sample gas. Whilst the additional gas may have some regions of absorption which overlap those of the gas or gases to be detected in the sample, it should have no region of absorption which overlaps regions of absorption of the other component gases in the sample. It will therefore not interfere with normal operation of the analyser.

A filter cell arrangement 8 is provided for each path and comprises a cell in each path the cells being connected to one another.

When it is desired to check the zero setting a zero-setting gas is introduced into the filter cells 8 which gas absorbs all the wavelengths of radiation capable of being absorbed by the component or components under test in the sample gas but which transmits those wavelengths capable of being absorbed by the additional gas in the detector. Thus when the said filter cells are supplied with said zero-setting gas the detector is made totally insensitive to the sample gas and the output meter can be brought to indicate zero by the adjustment of the balancing shutter 7.

The use of a filter cell in each path means that the instrument is not unbalanced to any great degree by the introduction of the zero-setting gas and any such unbalance can readily be corrected by trimming devices insertbale in the beam paths to allow for small differences in transmission between the filters. The use of a filter cell in the sample path and an attenuator in the reference path would also be possible although from a practical viewpoint it is not so desirable because of the above-mentioned unbalance between the beam paths created by the introduction of the zero-setting gas into the sample path and the need to use an attenuator to remove the unbalance.

The zero-setting gas is of course only introduced during periods of checking the zero of the recording meter. During normal working of the instrument, the filter cells 8 could be filled with a non-absorbing gas which would be replaced by the zero-setting gas when a zero-check is to take place.

The zero-setting gas may be the component to be detected in the sample or a mixture of components to be detected in the sample.

Instead of using filter cells containing a zero-setting gas, solid filters may be used to fulfill the same function or a combination of solid and gas filters may be used.

The use of filters as described does not preclude the use of conventional filter in infra-red gas analysers for well known purposes such as sensitising the instrument to various components under test in the sample gas. If such conventional filters are used they may be mounted on a turret with the filter used for zero-setting and brought into operation as required by rotation of the turret.

For a rough sensitivity check a calibrating wire may be used as previously described. Such a calibrating wire is shown at 9 in FIGURE 1.

If a sensitivity check is required using a particular gas or gas mixture a cell for said gas must be incorporated in one of the beam paths. FIGURE 2 shows an analyser incorporating such a cell 10. Such a cell would be incorporated in the sample path only and a known concentration of the calibrating gas or calibrating gas mixture as the case may be would be introduced into the cell only when a gas sensitivity check is required. The calibrating gas or gas mixture must absorb at least in part the wavelengths capable of being absorbed by the additional gas in the detector compartments 4a and 4b. For example, it may be identical to the additional gas added to the detector.

In FIGURE 2 the zero-setting filters are shown as optical filters 11, but if desired the cell 10 could be used for the dual purpose of zero-setting check and sensitivity checks and the filters 11 could be dispensed with provided that a fixed attenuator is introduced into the reference path to compensate for radiation absorbed by the zero-checking gas and that a mixed gas composed of zero-checking gas plus calibrating gas is put into cell 10 when a sensitivity check is to be made. The analyser of FIGURE 2 also incorporates calibrating wire 9 for rough sensitivity checks.

The analyser described above enables zero-setting and accurate sensitivity checks to be carried out whilst the sample is flowing through the sample cell or vessel.

I claim:

1. An infra-red gas analyser comprising a source of radiation, means directing said radiation into a sample beam path and a reference beam path, a cell containing a sample gas under test located in said sample path, a detector comprising means defining a chamber, a diaphragm dividing said chamber into two separate compartments, a fixed electrode located adjacent said diaphragm one compartment receiving radiation from the sample path and the other compartment receiving radiation from the reference path, a first gas located in both compartments, said first gas being identical with a gas whose presence in the sample gas is to be measured, an additional gas located in both said compartments, said additional gas having a region of absorption different from that of any of the gases present in the sample gas, a balancing shutter in one beam path, filter means insertable in at least the sample path during checking periods only, said filter means being arranged to absorb all the wavelengths capable of being absorbed by gas to be determined in the sample but to transmit the wavelengths capable of being absorbed by said additional gas in the detector, and a rotating-shutter interrupting both beam paths intermittently between the source and the detector.

2. An infra-red gas analyser as claimed in claim 1, in which the filter means are constituted by solid optical filters.

3. An infra-red gas analyser as claimed in claim 1, in which the filter means are constituted by gaseous filters.

4. A gas analyser as claimed in claim 1, in which the sample path includes a cell into which a gaseous calibrating medium may be introduced, during periods of checkings, to enable sensitivity to be checked at intervals, said calibrating medium absorbing at least in part the wavelengths capable of being absorbed by the said additional gas.

5. A gas analyser as claimed in claim 4, in which the cell for checking sensitivity is one which is also used during periods of zero setting as a cell housing a gaseous filter.

6. In infra-red gas analyser comprising a source of radiation, means directing said radiation into a sample beam path and a reference beam path, a cell containing a sample gas under test located in said sample path, a detector comprising means defining a chamber, a diaphragm dividing said chamber into two separate compartments, a fixed electrode located adjacent said diaphragm one compartment being positioned to receive the radiation from said sample path and the other compartment being positioned to receive radiation from said reference path, a first gas located in both said compartments, said first gas having spectral regions of absorption similar to those of the gas whose presence in the sample gas is to be measured, an additional gas located in both said compartments, said additional gas having a region of absorption different from that of any of the gases present in the sample, a balancing shutter in one beam path, filter means insertable in at least the sample path during checking periods only, said filter means being arranged to absorb all the wavelengths capable of being absorbed by the gas to be determined in the sample but to transmit the wavelengths capable of being absorbed by said additional gas in the detector, and a rotating shutter interrupting each beam path intermittently between the source and the detector.

References Cited by the Examiner
UNITED STATES PATENTS

| | | | |
|---|---|---|---|
| 2,443,427 | 6/48 | Kidder et al. | 250—43.5 |
| 2,668,243 | 2/54 | Williams | 250—43.5 |
| 2,756,342 | 7/56 | Miller | 250—43.5 |
| 2,806,144 | 9/57 | Berger et al. | 250—43.5 |
| 2,951,939 | 9/60 | Luft | 250—43.5 |
| 3,014,129 | 12/61 | Martin | 250—43.5 |
| 3,022,422 | 2/62 | Grove-White | 240—43.5 |

RALPH G. NILSON, *Primary Examiner.*